United States Patent [19]
Robertson

[11] 3,944,366
[45] Mar. 16, 1976

[54] SLIDING PLATEN COVER APPARATUS
[75] Inventor: Donald A. Robertson, Fairport, N.Y.
[73] Assignee: Xerox Corporation, Stamford, Conn.
[22] Filed: Aug. 26, 1974
[21] Appl. No.: 500,803

[52] U.S. Cl. .................... 355/76; 355/133; 271/84
[51] Int. Cl.² ................................. G03B 27/62
[58] Field of Search ............ 355/64, 65, 75, 47, 18, 355/133, 128, 76, 91, 92, 93, 115; 271/84

[56] References Cited
UNITED STATES PATENTS

| | | | |
|---|---|---|---|
| 3,304,849 | 2/1967 | Cranskens et al. ................ | 355/115 |
| 3,352,222 | 11/1967 | Salger ............................ | 355/113 X |
| 3,560,090 | 2/1971 | Jones ............................. | 355/91 X |
| 3,615,134 | 10/1971 | Newcomb ........................ | 355/75 |
| 3,726,589 | 4/1973 | Difulvio et al. ................. | 355/75 X |
| 3,737,223 | 6/1973 | Yamamoto ...................... | 355/75 X |
| 3,826,572 | 7/1974 | Duerr ............................ | 355/91 X |

FOREIGN PATENTS OR APPLICATIONS
733,641  6/1952  United Kingdom ................ 355/91

*Primary Examiner*—L. T. Hix
*Assistant Examiner*—Alan Mathews

[57] ABSTRACT

Sliding platen cover apparatus which supports a stack of documents to be copied on the platen of a copier machine, and then is moved over the document to be copied and actuated to produce a frictional contact with the document against the platen. After copying and while in frictional contact, the cover apparatus is slidingly moved in a reverse direction to remove the document from the platen enabling the next document to be placed on the platen. The platen cover apparatus uses an articulated platen pad which is urged into contact with the document on the platen by a handle operated by a machine operator. The apparatus maintains frictional contact with the document until it is deposited into a receiving tray adjacent to the platen.

3 Claims, 9 Drawing Figures

SLIDING PLATEN COVER APPARATUS

This invention relates to an improved sliding platen cover apparatus which enables the positioning of precollated documents to be copied from a stack on a platen and then removed from the platen area of a copier machine and stacked neatly.

The handling of precollated documents which are to be copied on a copying machine or the like requires that each document be positioned on the platen and then removed in a collated fashion. This can be done by manually positioning each document on the platen in its prescribed sequence and removing the document for stacking in proper order so that they can be recopied another time. Obviously this is a painstaking operation since it is strictly manual and requires operator alertness at all times. An alternative to this type of operation would be a fully automatic operation in which an automatic feeding device is used to feed documents from a stack and then remove them from the platen area. Needless to say, the expense and complexity of such a device, which must be coupled by logic to the copier is a serious concern in the operation of a simple and inexpensive copying machine. For this reason, it is desirable to have a simple and inexpensive document handling device which enables positioning of each document from a collated stack of documents onto the platen and then removed in simple manner under operator control to maximize use of the copying machine and to produce copies as economically as possible.

It is, therefore, the general object of the present invention to provide a controlled manual removal of documents from the platen of a copier machine or the like.

It is a further object of the present invention to provide a tray area specifically designed for accepting copied documents after they are removed from the platen of a copier machine.

It is still a further object of the present invention to enable manual removal of uncopied documents from a cover situated adjacent to the platen of a copier machine.

It is a further object of the present invention to enhance the copied of multiple original documents in copy sets whereby improved thruput time is accomplished.

It is a further object of the present invention to enable the copying of original documents and/or books by a sliding platen cover apparatus with improved machine thruput time.

It is a further object of the present invention to provide an improved design for a platen cover apparatus which may be operated at machine operator convenience, and which is not coupled to the machine logic or dependent upon the machine for its power requirements.

These objects, as well as other objects, will become more apparent after a reading of the detailed description which follows and which should be read in conjunction with the drawings in which:

FIG. 1 is a perspective view of the platen cover apparatus of the present invention in the off platen position of a copier machine;

FIG. 2(a) through 2(d) illustrate the sequential operation of the platen cover apparatus, FIG. 3 is a side view of the platen cover apparatus of the invention;

Figure 1:
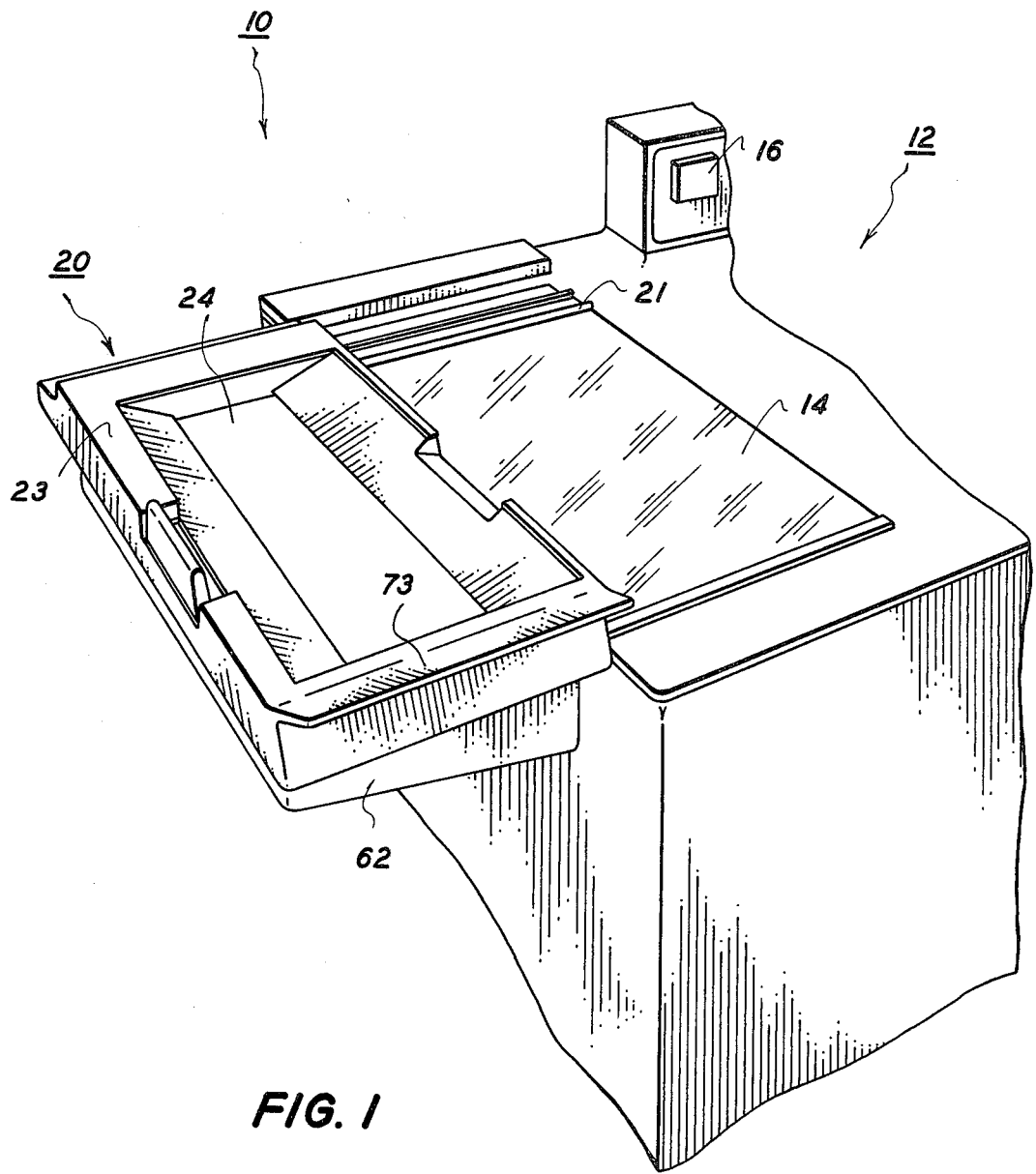

Referring now to FIG. 1, there is shown the platen cover apparatus of the invention generally designated 10 positioned on an electrostatic copier machine 12 or the like which has a platen 14 on which documents are to be copied. Documents are placed on the platen and a START PRINT button 16, when pressed, initiates the printing cycle of the copier processing stations which are well known to those skilled in the art. The platen cover apparatus of the invention includes a cover 20 secured to a frame 22 which is mounted on a slide 21 secured through a hinge 70 to machine 12 to slide over the platen and then into contact with a document on the platen. After sliding in a reverse direction, the document is translated through frictional force of a lowered platen pad 32 and deposited into a receiving tray as will be explained more fully hereinafter.

Figure 2A:
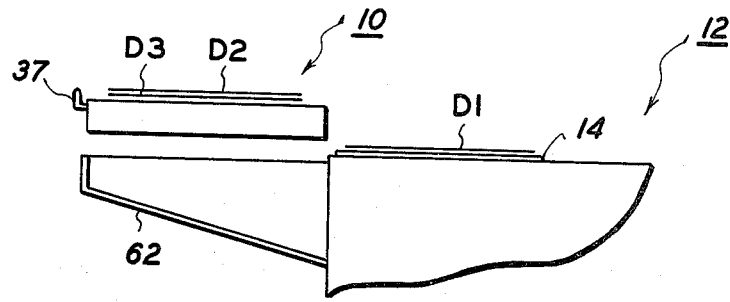
Figure 2B:
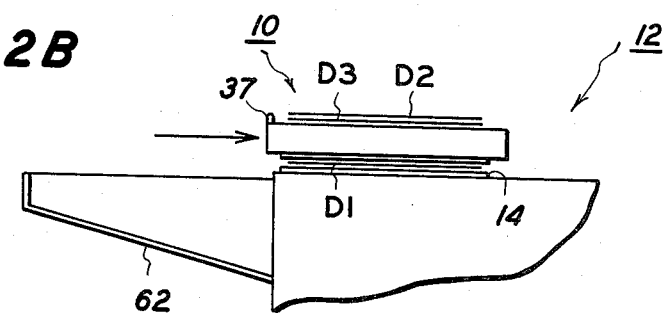
Figure 2C:
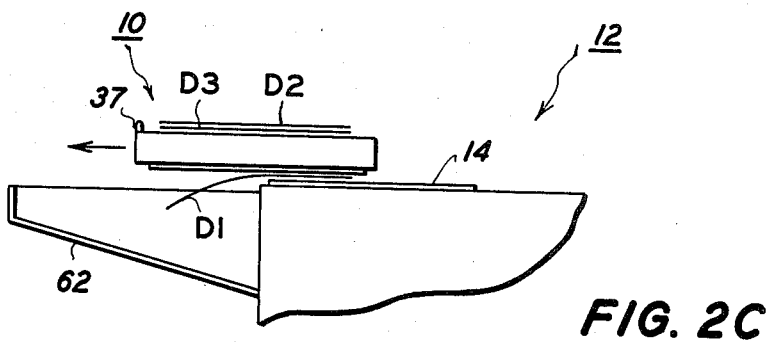
Figure 2D:
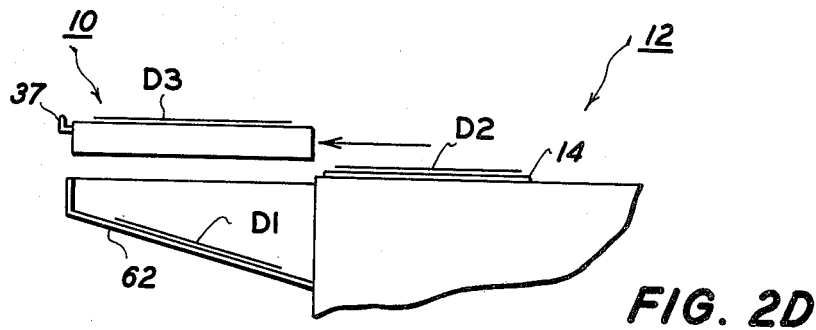
Figure 3:
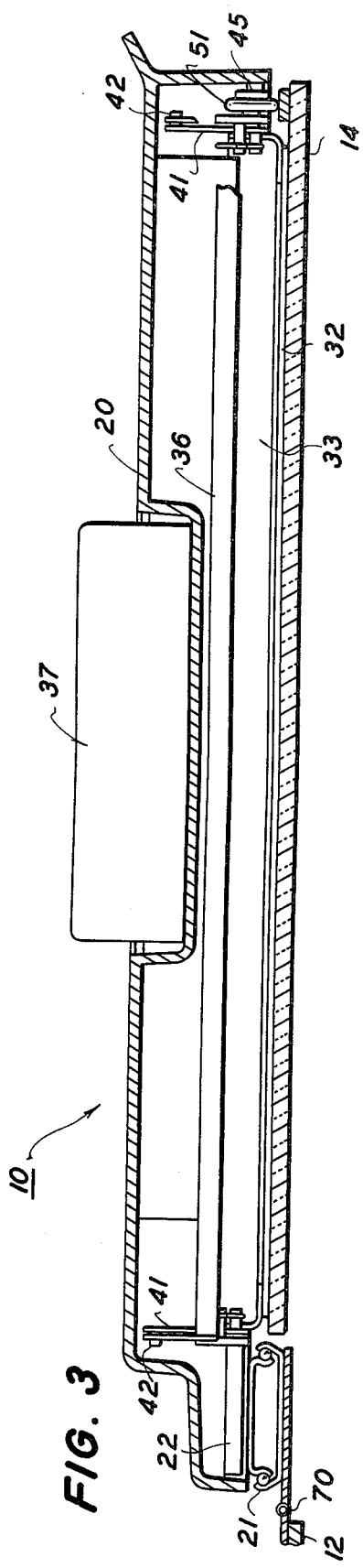
Figure 4:
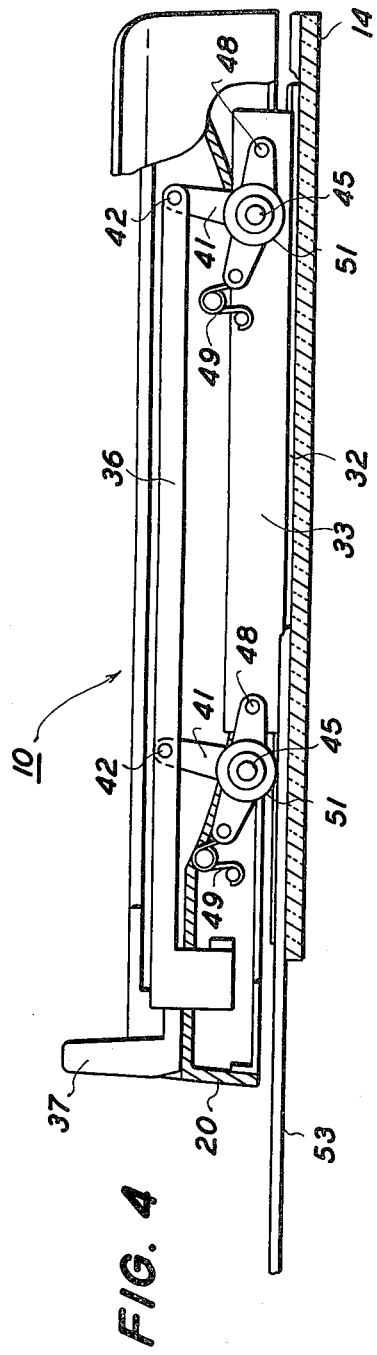
FIG. 4 is a front elevational view of the platen cover apparatus with parts borken away to show details thereof.
Figure 5:
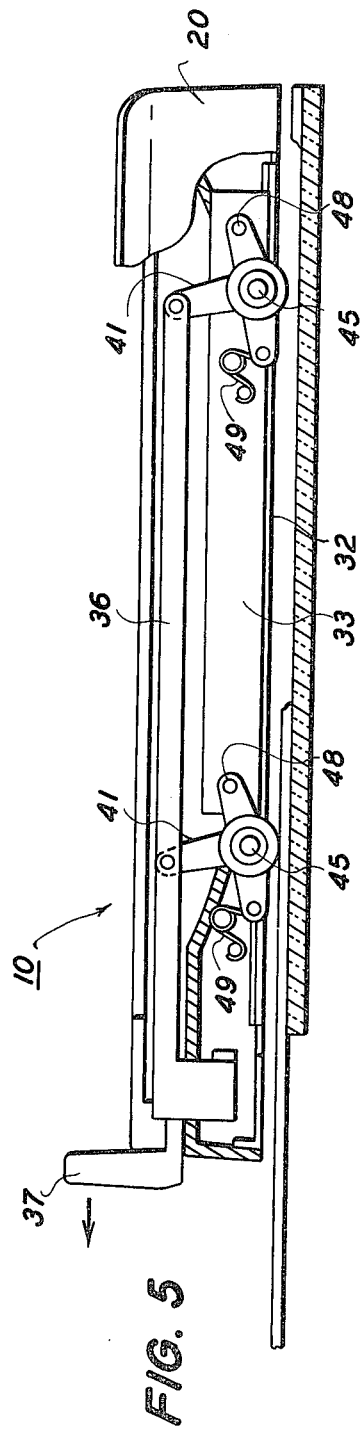
FIG. 5 is a view similar to FIG. 4 except that the platen cover apparatus has traveled relative to the frame as shown by the arrow.

An appreciation of the general movements of the platen cover apparatus can be had by observing FIGS. 2(a) through 2(d). In FIG. 2(a), the platen cover apparatus 10 is to the left, looking at the FIG. allowing access to the platen 14 on the copier machine. D1 designates the first document to be copied, which is placed in overlying relationship on the platen 14. Documents D2 and D3 are positioned on top of the platen cover apparatus awaiting to be copied. In FIG. 2(b), the platen cover apparatus is moved in the direction of the arrow into overlying relationship with the document D1 and lowered into contact therewith. At this time, the copying cycle is commenced by pressing START PRINT button 16. In FIG. 2(c), after copying, the platen cover apparatus is moved in a reverse direction frictionally engaging document D1 and moving it in the same direction until it is deposited into a receiving tray. At this time, document D2 is positioned manually onto the top of the platen 14. The apparatus is now ready to commence another copying cycle.

Referring now to FIGS. 1, 3, 4 and 5, the platen cover apparatus 10 includes the cover 20 comprising contiguous walls 23 defining a tray 24. Walls 23 extend below tray 24 and define a cavity to receive a movable platen pad frame 33 and pad 32 which is made of frictional material such as rubber or the like. Pad frame 33 is connected to the apparatus frame 22 through tie rods 35 which are collectively joined to cross member 36 and assembled to a handle 37 through which manual force is applied to actuate the pad 32 to the alternate of its two positions up or down. Tie rods 35 are part of a parallelogram type linkage which includes T-shaped arms 41 which are connected to tie rods 35 by means of pivot pins 42. T-Shaped arms 41 are connected to apparatus frame 22 by pins 45 and support pad frame 33 through pins 48. T-shaped arms 41 also are biased against the action of torsion springs 49 which provide a biasing action against which the pad member is raised and lowered by handle 37. It will be noted that also supported on pins 45 are wheels 51 which are positioned to ride on a track 53 to facilitate the sliding action of the platen cover apparatus along the surface of copier machine 12.

It will now be appreciated that when the platen cover apparatus 10 has been manually translated to its limit of travel, additional force on the handle 37 will throw the pad frame 33 and pad 32 into the opposite position. In other words, when the platen cover apparatus is slid into overlying relationship with the platen and an additional force is applied on the handle 37, this will cause tie rods 35 to lower pad 32 into frictional contact with the document. Alternatively, when the platen cover apparatus is moved in a direction away from the platen, an additional force on the handle 37 will cause the tie rods 35 and pad 32 to be raised out of contact with the platen.

In operation, a stack of documents is placed into tray 24 (FIG. 1) of the platen cover apparatus. The first document is then placed manually from the platen cover apparatus onto the platen 14. The platen cover apparatus is moved over the platen with pad 32 in raised position until in registration with the platen when the pad is lowered onto the document after a full translation of the platen cover apparatus thereby pressing the document firmly against the platen surface for copying thereof. The copy cycle is initiated by depressing the START PRINT button 16. After copying the document, the platen cover apparatus is moved in a reverse direction away from the platen while the pad maintains pressure against the document pulling the document with it off from the platen. The document is moved towards a receiving tray 62 (FIG. 6) mounted on the copier machine. At the limit of motion through which the platen cover apparatus is moved, handle 37 actuates the pad 32 above the platen. The apparatus is now ready to commence another cycle over a second document which is then placed on the platen.

Figure 6:
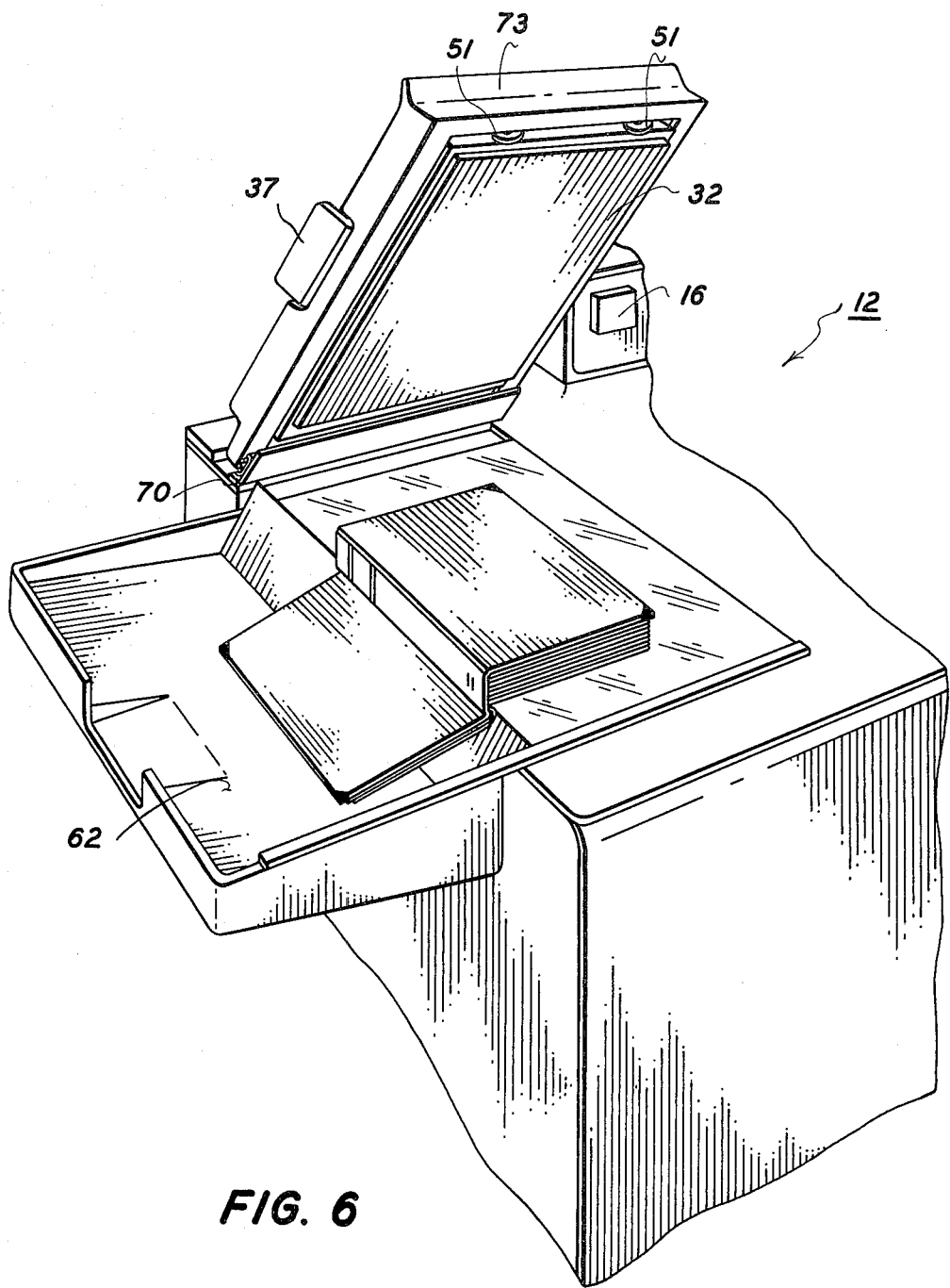
FIG. 6 is another perspective view of the platen cover apparatus of the invention illustrating its operation when copying a book on the copier machine.

Referring now to FIG. 6, there is shown the platen cover apparatus in a raised position to enable the copying of books or the like by positioning the book on the platen and supported by the receiving tray 62. It will be appreciated that the slide 21 is pivoted on a hinge 70 to enable lifting of the apparatus into a raised position. A projecting lip portion 73 on the cover 20 facilitates gripping the frame to lift the apparatus into its raised position.

By the above-described invention, there is shown a prime cover apparatus which enables the controlled manual positioning and removal of documents from the platen of a copier machine or the like. By the invention, a machine operator may conveniently provide for continued thruput time for copying of multiple documents at the operators convenience and without having to be concerned with the cycling time of machine components. Furthermore, since the platen cover apparatus is completely manual in its design and operation there is no requirement to couple the apparatus into the machine logic. Furthermore, due to its unique design, it is possible to copy multiple documents or books at the option of the machine operator in a very simple and inexpensive manner.

What is claimed is:

1. Platen cover apparatus comprising:
    a frame mounted on a copier machine adjacent to a platen area, said frame being slidable relative to the machine;
    cover means mounted on the frame having contiguous walls defining a tray for supporting a stack of documents to be copied and an open bottom therebelow;
    a pad member received in the bottom of said cover means;
    a parallelogram linkage connecting said pad member to said frame, said linkage being movable from a first position when the cover means is in a non-copying position to a second position in which said linkage is urged against the action of torsion spring means when the cover means is in a copying position,
    said linkage including shaft members supporting rollers adapted for sliding along a track on the machine adjacent to the platen area, and
    handle means connected to said linkage whereupon after sliding of the cover means over the platen area and actuation of said handle means said linkage is moved from its first position into its second position to position said pad member into frictional contact with a document for copying thereof, and after copying, upon sliding of the cover means in an opposite direction with said handle means engaged the document is transported into a receiving tray on the machine.

2. Apparatus according to claim 1 wherein said track is pivotably mounted on said copier machine for pivoting on an axis parallel to the plane of the platen area.

3. Apparatus according to claim 1 wherein said pad member includes a friction surface at the lowermost part thereof.

* * * * *